March 10, 1936. P. C. KEITH, JR 2,033,472
PROCESS AND APPARATUS FOR TREATING HYDROCARBON OILS
Filed June 13, 1933
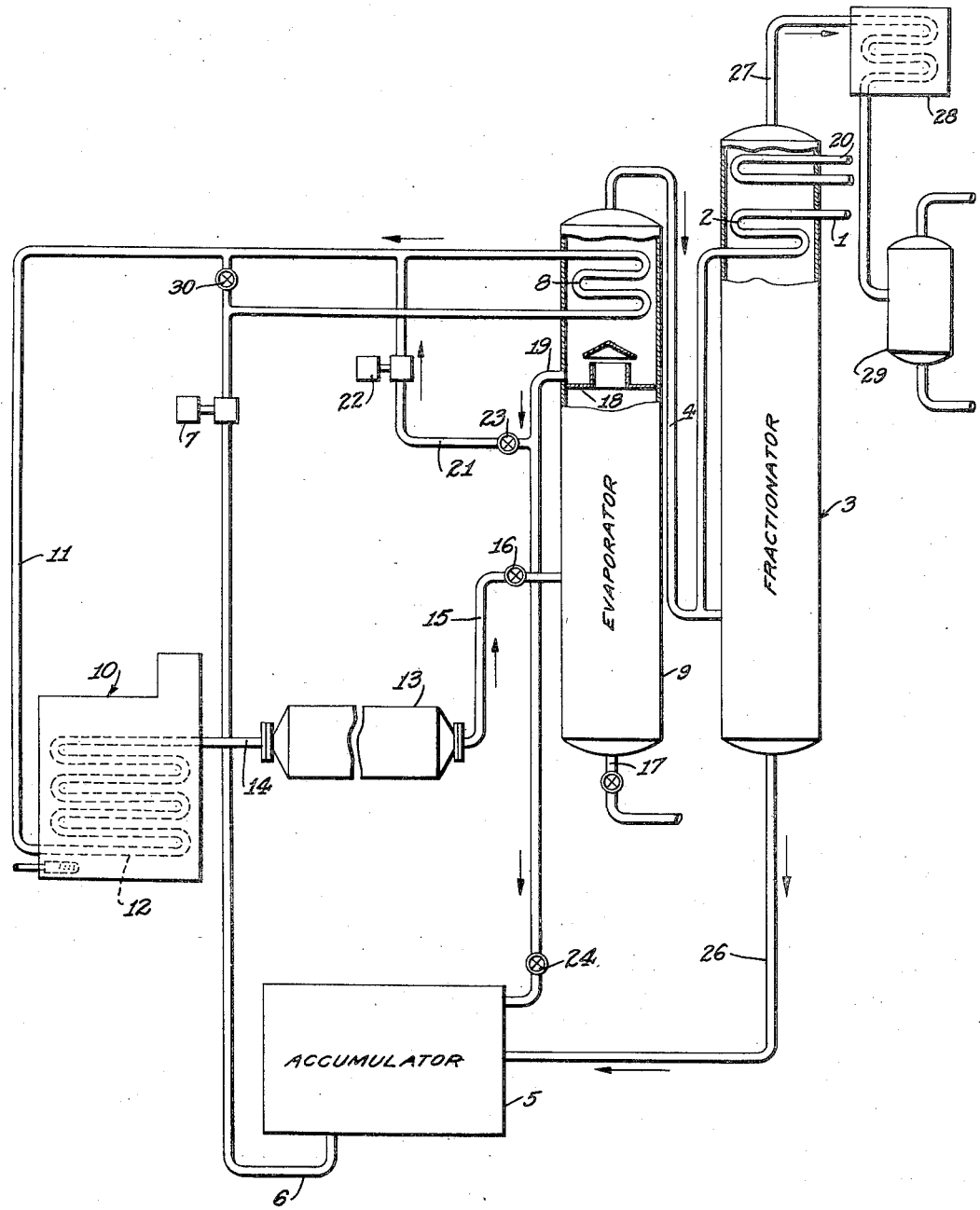
INVENTOR
PERCIVAL C. KEITH JR.
BY *Donald H. Mace*
ATTORNEY Patented Mar. 10, 1936

2,033,472

UNITED STATES PATENT OFFICE 2,033,472

PROCESS AND APPARATUS FOR TREATING HYDROCARBON OILS

Percival C. Keith, Jr., Port Washington, N. Y., assignor to Gasoline Products Company, Inc., Newark, N. J., a corporation of Delaware Application June 13, 1933, Serial No. 675,541

3 Claims. (Cl. 196—48)

This invention relates to processes for converting higher boiling hydrocarbon oils into lower boiling hydrocarbon oils, and more particularly to processes for fractionating vapors and preheating charging stock in cracking systems.

A known process of treating hydrocarbon oil consists in heating the oil to a cracking temperature in a tube still or other device, passing the heated products to a vaporizer to separate these products into vapors and a residue, and then conducting the vapors to a fractionator wherein a desired final vapor fraction is segregated. In carrying out this process cooling of the vapors in the fractionator and also in the vaporizer is desirable in order that the necessary separation of the products may be attained.

It is an object of my invention to provide an improved method and apparatus for supplying cooling to the evaporator and to the fractionator of an oil cracking system adapted to carry out the above mentioned process, whereby more efficient operation of the system as a whole results.

In accordance with my invention, fresh charging stock, which is used as a cooling medium, is passed in indirect heat exchange relation with the vapors in the top of a fractionator and is then introduced into the vapor line which serves to introduce the vapors into the fractionator. A composite liquid consisting of reflux condensate and unvaporized fresh feed oil is withdrawn from the bottom of the fractionator and collected in an accumulator tank from which it is withdrawn and passed in indirect heat exchange relation with the vapors in the top of the evaporator, which supplies the vapors for the fractionator already mentioned. The resulting heated composite feed stock is then introduced into the cracking furnace of the system. The indirect cooling in the top of the evaporator causes the production of a condensate which is collected in a trap out tray and transferred from the evaporator to the accumulator tank. An alternative arrangement would be to pump this condensate directly into the pipe line leading from the indirect heat exchanger in the top of the evaporator to the cracking furnace.

The above mentioned and further objects and advantages of my invention and the manner of attaining them will be explained more fully in the following description taken in connection with the accompanying drawing.

The drawing is a diagrammatic view of a cracking system constructed in accordance with my invention.

In the drawing, reference numeral 1 indicates a fresh feed line through which charging stock is forced by a pump (not shown). The charging stock passes through a cooling coil 2 in the top of fractionator 3 and is then introduced into vapor line 4 through which a mixture of vapors and fresh charging stock is injected into the bottom of the fractionator. In the fractionator this fresh charging stock is freed to a greater or lesser extent, of its lighter fractions, and the unvaporized charging stock, combined with reflux condensate is withdrawn from the bottom of the fractionator through pipe line 26 and is introduced into accumulator or reservoir 5. Oil is withdrawn from the accumulator through pipe line 6 and is forced by pump 7 through cooling coil 8 in the top of evaporator 9, after which it is introduced into heating coil 12 of furnace 10 through pipe line 11. In the furnace the oil is heated to a cracking temperature under suitable pressure and passed to the reaction chamber 13 through pipe line 14.

After having been soaked in the reaction chamber for a certain period of time the oil is transferred to evaporator 9 through pipe line 15 having therein a pressure reducing valve 16. In the evaporator separation of the cracked products into vapors and a tar like residue takes place, the vapors passing overhead through vapor line 4, while the heavy tar is withdrawn from the system through draw-off line 17. The vapors ascending in the evaporator come in contact with cooling coil 8 and a portion of the vapors is condensed as a result, the reflux condensate being collected by trap-out tray 18 and passed through conduit 19 into the accumulator 5. The product withdrawn from the accumulator is, therefore, a mixture of stripped fresh charging stock, reflux condensate from the fractionator, and reflux condensate from the evaporator.

A trim oil coil 20 is provided in the top of the fractionator for supplying such further cooling, in addition to that available from the fresh feed oil, as is necessary for the successful operation of the fractionator. Twenty-seven (27), 28, and 29 are respectively, a vapor pipe, condenser, and receiving drum for vapors of the desired end point.

By virtue of the above described arrangement of apparatus the fresh charging stock is heated, prior to introduction into the furnace, to a higher temperature than has been obtained with systems known heretofore. The amount of trim oil necessary is reduced, and the load of the fractionator column, is likewise reduced by condensation of heavy ends from the vapors prior to their passage through the upper portion of the fractionator. Furthermore, the introduction of the heated fresh feed oil into the vapor line 4 inhibits coking of the outlet thereof and of the lower plates in the fractionator.

An alternative connection, which necessitates an additional pump, may be obtained by providing a cross-over line 21, between the conduit 19 and pipe 11. This cross-over line has a pump 22 and a valve 23 therein. A valve 24 is also provided in the conduit 19 between the points of connection thereof with the cross-over line and the accumulator. By regulating valves 24 and 23 it is possible to introduce any desired amount of reflux condensate from trap-out tray 18 directly into the furnace feed line 11. The advantage of this is that the reflux condensate, which is hotter than the vapors in the top of the evaporator, will not be combined with the relatively cool oil in the accumulator prior to the passage thereof through the evaporator cooling coil 8. The necessity for the use of two pumps in this system would be more or less balanced by the additional cooling obtained in the top of the evaporator and the relatively larger amount of heat picked up by the furnace charging oil as a result. Either all or any part of the reflux condensate from tray 18 may be passed through cross-over line 21. Thirty (30) is a by-pass valve by means of which stock may be diverted in any desired quantities directly to line 11 from pump 7, to produce the desired cooling at the top of the evaporator.

In operation fresh feed oil or charging stock such, for example, at 35° M. C. gas oil, is introduced through the pipe line 1 and heat exchanger coil 2, where it picks up a certain amount of heat, and is then injected into the vapor line 4, where it mingles with the cracked vapors and is introduced into the fractionator 3. In the bottom of the fractionator the lighter components of the fresh charging stock are partially vaporized by the heat picked up in the heat exchange coil 2 and that supplied by the vapors from the evaporator. The stripped fresh charging stock and reflux condensate collect in the bottom of the fractionator and are withdrawn as a mixture through pipe line 26 and introduced into the accumulator 5. The accumulator may be located at a lower level than the fractionator in order to cause the oil to flow thereinto by gravity, or if desirable sufficient pressure may be maintained in the fractionator to cause this movement of the oil. The heated oil mixture is withdrawn from accumulator 5, which serves as a reservoir, and is forced through the heat exchange coil 8 by pump 7. In this coil additional heat is picked up from the relatively hot vapors in the top of the evaporator, the temperature of these vapors being in excess of that of the oil from the accumulator, and the highly heated mixture is then introduced into the furnace 10, where it is heated to a cracking temperature under relatively high super-atmospheric pressure. The resulting hot oil then is passed into reaction chamber 13 where additional conversion takes place, the oil being subsequently transferred to the evaporator 9, which may be held at a lower pressure through the agency of pressure reducing valve 16. In the evaporator the highly heated cracked products separate into a vapor portion which passes upwardly through the evaporator and is dephlegmated to a certain extent by a reflux condensate produced by the heat exchange coil 8, and an unvaporized portion which collects in the evaporator and is withdrawn from the system through draw-off line 17. The vapors rising through the tower come in contact with the cooling coil 8 and the resulting reduction in temperature of the vapors causes the condensation of heavier fractions therefrom. The condensed heavier fractions collect on the trap-out plate 18 and pass through the conduit 19, either into accumulator 5 or through cross-over line 21 into pipe 11, depending upon the setting of valves 23 and 24. The dephlegmated vapors travel through the vapor line 4 into fractionator 3, as already mentioned. Vapors of the desired end point are withdrawn from the fractionator through pipe line 27 and condenser 28, being finally collected in drum 26.

While I have described a particular embodiment of my invention for purposes of illustration it should be understood that various modifications and adaptations thereof may be made within the spirit of the invention as set forth in the appended claims.

I claim:

1. The process of treating hydrocarbon oil which comprises passing preheated oil through a heating zone wherein it is raised to a cracking temperature, dephlegmating vapor from the heated oil in a second zone, conducting the dephlegmated vapors into a fractionating zone, withdrawing vapors of the desired end point from said fractionating zone, passing fresh charging stock in indirect heat exchange relation with the vapors in said fractionating zone and subsequently combining the heated charging stock with the vapors introduced into said fractionating zone, withdrawing from said fractionating zone a mixture of unvaporized fresh charging stock and condensed portions of said vapors, combining with said mixture a reflux condensate derived from said second zone, passing the combined products in indirect heat exchange relation with the vapors in said second zone and thereafter utilizing said combined products as said preheated oil.

2. The process of treating hydrocarbon oil which comprises passing said oil through a cracking zone wherein it is raised to a cracking temperature and subjected to conversion, passing resulting cracked products into a vaporizing zone wherein vapors separate from liquid residue, introducing resulting vapors into a fractionating zone, and providing charging stock for the process by passing fresh feed stock in indirect heat exchange with vapors in the top of said fractionating zone, combining the heated fresh feed stock with reflux condensate in the bottom of said fractionating zone, removing the combined product and passing it in indirect heat exchange relation with the vapors in said vaporizing zone, to condense heavier portions of said vapors, combining said heavier portions with said combined product prior to the passing of the latter in indirect heat exchange relation with said vapors in said vaporizing zone, and passing the resulting mixture through said cracking zone.

3. An apparatus for treating hydrocarbon oil comprising a cracking coil, an evaporator and a fractionator, means for passing oil from said cracking coil into the lower portion of said evaporator, means for passing vapors from the upper portion of said evaporator into said fractionator, an indirect heat exchange coil in the top of said evaporator, an indirect heat exchange coil in the top of said fractionator, means for passing fresh charging stock through said coil last-mentioned and from said coil into the lower portion of said fractionator, means for withdrawing liquid from a still lower point in said fractionator and passing it through said indirect heat exchange coil in the top of said evaporator, means for conducting the heated oil from said coil last-mentioned to said cracking coil, a trap-out tray in said evaporator below said indirect heat exchange coil, and means for conducting said condensate from said trap-out tray into mixture with the liquid withdrawn from said still lower point in said fractionator prior to the passage thereof through said indirect heat exchange coil in the top of said evaporator.

PERCIVAL C. KEITH, JR.